(12) United States Patent
Okuda

(10) Patent No.: US 6,957,926 B2
(45) Date of Patent: Oct. 25, 2005

(54) MAGNET MOUNTING STRUCTURE

(75) Inventor: Yoji Okuda, Tondabayashi (JP)

(73) Assignee: Cateye Co. Ltd., Osaka (JP)

( * ) Notice: Subject to any disclaimer, the term of this patent is extended or adjusted under 35 U.S.C. 154(b) by 0 days.

(21) Appl. No.: 10/390,293

(22) Filed: Mar. 17, 2003

(65) Prior Publication Data

US 2003/0180090 A1 Sep. 25, 2003

Related U.S. Application Data

(63) Continuation of application No. 09/922,561, filed on Aug. 3, 2001, now abandoned.

(30) Foreign Application Priority Data

Aug. 23, 2000 (JP) ........................................ 2000-252518

(51) Int. Cl.$^7$ ................................................. B25G 3/20
(52) U.S. Cl. ................. 403/374.3; 24/135 R; 248/74.4; 324/174; 324/166; 403/DIG. 1; 403/384
(58) Field of Search ................................ 324/174, 166; 403/373, 374.1, 374.2, 374.3, 374.4, 384, 395, 396, 256, 257, DIG. 1; 74/531; 24/135 R; 248/74.4, 74.5; 411/393, 408, 409

(56) References Cited

U.S. PATENT DOCUMENTS

| | | | | |
|---|---|---|---|---|
| 4,037,925 A | * | 7/1977 | Fleming | 359/523 |
| 4,058,242 A | * | 11/1977 | Brewer | 224/606 |
| 4,488,774 A | * | 12/1984 | Kagayama | 359/523 |
| 5,089,775 A | * | 2/1992 | Takeda | 324/174 |
| 5,480,273 A | * | 1/1996 | Jou | 411/373 |
| 6,286,192 B2 | * | 9/2001 | Pfister | 24/514 |
| 6,595,473 B2 | * | 7/2003 | Aoki et al. | 248/74.4 |

FOREIGN PATENT DOCUMENTS

| | | | |
|---|---|---|---|
| EP | 0 432 475 A1 | 6/1991 | |
| GB | 2128337 | 4/1984 | |
| JP | 50-41240 | 4/1975 | |
| JP | 54-39864 | 3/1979 | |
| JP | 04-135995 | 5/1992 | |
| JP | 7280821 | * 10/1995 | ........... G01P/3/487 |

* cited by examiner

*Primary Examiner*—William L. Miller

(57) ABSTRACT

A magnet mounting structure for fastening a magnet to a spoke of a two-wheeled vehicle even without tool includes a knob member having a screw and the magnet and an internal thread member in which the screw is screwed. The spoke is held between the knob member and the internal thread member to allow the magnet to be fastened to the spoke.

11 Claims, 4 Drawing Sheets

MAGNET MOUNTING STRUCTURE

RELATED APPLICATION

This application is a continuation of patent application Ser. No. 09/922,561 filed Aug. 3, 2001, now abandoned which claimed priority of Japanese application Ser. No. 2000-252518(P) filed Aug. 23, 2000.

BACKGROUND OF THE INVENTION

1. Field of the Invention

The present invention relates to a structure for mounting a magnet. Specifically, the invention relates to a magnet mounting structure for attaching a magnet which renders a signal to a sensor to detect the running speed of a two-wheeled vehicle.

2. Description of the Background Art

An increasing number of bicycles employ a speedometer mounted thereto for facilitating ascertainment of the travelling speed, travelling distance and the like of the bicycles. FIG. 5 is an external view of a bicycle incorporating a speedometer therein and FIG. 6 is an enlarged view of the portion indicated by X in FIG. 5. A signal generator/transmitter portion is constituted of a transmitter unit 128 detachably mounted to a front fork 134 of a bicycle 124 and a magnet 113 detachably mounted to a front spoke 130 thereof. Magnet 113 is spaced from a front axis 136 by a distance A corresponding to the distance between front axis 136 and transmitter unit 128.

These components are thus structured so that each time magnet 113 passes in front of transmitter unit 128, a magnetic flux originated from magnet 113 causes contacts of a reed switch (not shown) incorporated in transmitter unit 128 to close and accordingly a signal of one pulse is generated. The generated signal is transmitted from transmitter unit 128 to a receiver unit 135 attached to a stem 119. Receiver unit 135 counts the transmitted signal to calculate various measurements such as the travelling speed, travelling distance and the like of the bicycle. A display unit (not shown) is further provided formed of liquid crystal for example for indicating calculated measurements.

Although the magnet is attached to a single spoke as shown in FIG. 6, the magnet may be attached to two spokes. FIG. 7 shows a conventional structure for mounting a magnet to a single spoke 130. This mounting structure is used to attach the magnet in the following manner. First, the spoke is inserted through two slits cut in a projecting piece 103 jutting out from a magnet housing 102. The slits extend from top end to magnet housing 102. Then, a ring 104 is fit on projecting piece 103 and a setscrew 105 is screwed into a threaded portion 108 provided inside projecting piece 103. As setscrew 105 is being screwed in, ring 104 is pushed toward the spoke by the head of setscrew 105. Ring 104 in turn pushes spoke 130 toward magnet housing 102 while keeping contact with spoke 130 at two spots. Finally, ring 104 and magnet housing 102 are secured to spoke 130 with spoke 130 held therebetween. Ring 104 keeps pressing spoke 130 while contacting spoke 130 at the two spots. In this way, a firm attachment is achieved. For screwing setscrew 105, a tip of a screwdriver is fit in a driver slot made in the head of setscrew 105 shown in FIG. 7 to turn screw 105. Ring 104 of this securing structure restrains the perimeter of projecting piece 103 from bending outward. Then, the spoke in the slits can be engaged firmly with the slits to ensure the attachment.

However, the magnet mounting structure as described above requires some tool such as Phillips screwdriver, flatblade screwdriver or the like for mounting the magnet to the spoke. Unless such a tool is used for screwing, the magnet mounting structure cannot be secured firmly to the spoke. In other words, the conventional magnet cannot be secured to the spoke unless there is such a tool at hand.

SUMMARY OF THE INVENTION

One object of the present invention is to provide a magnet mounting structure to enable a magnet to be mounted to a spoke of a two-wheeled vehicle even without tool.

According to the present invention, a magnet mounting structure is a structure for fastening a magnet sensed by a sensor to a spoke of a wheel. The magnet mounting structure includes a knob member having a screw and containing the magnet and internal thread (female screw) member with the screw screwed therein. The spoke is held between the knob member and the internal thread member to fasten the magnet to the spoke.

The structure for fastening the magnet allows use of fingers instead of any tool for screwing the screw of the know member into the internal thread member, a head portion of the knob member being caught between the fingers for screwing the screw. (a) For a smooth screwing operation, the part of the knob member that is held between fingers, i.e., the head portion of the knob member is desirably large in size (axial length L and diameter D of the head portion). The torque of turning of the knob member by the finger is proportional to the diameter D of the head portion. Then, the diameter D of the head portion is desirably large. Except for the external surface of the head portion that is in contact with the fingers, the head portion can be used as a housing of the magnet. (b) The magnet requires at least a predetermined length in the axial direction (direction of a transmitter unit when the magnet passes the transmitter unit) in order to generate a sufficiently high magnetic flux density in the axial direction. For example, a thin and flat magnet cannot generate a magnetic flux of a sufficiently high density in the direction perpendicular to its flat planes. In this case, even if the magnet is made of a strong magnetic material, the demagnetizing factor determined by the shape of the magnet is large. Then, the magnetization within the magnet is cancelled by the demagnetizing field and sufficiently high magnetic flux density cannot be generated in the axial direction. If the magnet has at least a predetermined length in the axial direction, the demagnetizing factor is smaller. Then, the magnetization within the magnet is cancelled to a smaller degree so that a higher magnetic flux density is generated in the axial direction. The length L in the axial direction of the head portion is preferably long not only for facilitating holding by fingers but also for the reason described immediately above.

Regarding the structure for mounting a magnet without tool, the head portion of the knob member described above is large in both of the axial length and diameter. Thus, the magnet can be fit in the head portion and secured therein, for example. It is accordingly possible to hold the spoke between the knob member and the internal thread member and attach the magnet to the spoke without tool, by means of the compact structure with the weight reduced. In addition, even if the magnet is formed of an inexpensive magnetic material, the shape of the magnet allows a desired magnetic flux density to be generated toward the transmitter unit. The head portion of the knob member, which may herein be referred to merely as knob member, may be formed of a magnetic material itself or a container, for example, a cylindrical container including the magnetic material.

In the magnet mounting structure according to the present invention, the magnet is housed in the head portion of the knob member.

The magnetic material is brittle and thus easily chipped off at its corners. Then, the corners of the magnet are cut off and the side thereof is covered in order to avoid the corners from being exposed and thus lessen the risk that the magnet is partially chipped off. If any material with a high magnetic permeability is used to cover the side, the axial magnetic flux passes through the high-permeability material on the side and thus the axial magnetic flux decreases. Therefore, a nonmagnetic material is used to cover the side. Alternatively, the magnet may entirely be covered with a high tough material so that the top surface of the magnet is covered and no surface thereof is exposed. The material covering the top surface of the magnet may be either of a nonmagnetic material and a high-permeability material. When the magnet is relatively thin, a high-permeability material can be used to cover the top surface of the magnet so as to achieve both of a reinforcing effect and an effect that the magnet is made closer to the transmitter unit on account of the thickness of the high-permeability material. The state of the magnet in which only the side (including the cut-off corners) of the magnet is covered as well as the state of the magnet in which the side of the top of the magnet are covered are herein described as "(magnet is) housed in the head portion."

The head portion houses the magnet therein and thus has at least a predetermined axial length. Then, the magnet can be reinforced and the knob member can entirely be reduced in size and weight. Moreover, the attachment by means of fingers only without tool can be facilitated.

In the magnet mounting structure according to the present invention, the internal thread member has a surface which is opposite to the knob member and is provided with an elastic layer.

The elastic layer causes a repulsive force when the spoke is held between the knob member and the internal thread member. Accordingly, when the knob member is screwed in the internal thread member and stopped there, a frictional force is generated between respective threaded surfaces of the knob member and the internal thread member. These members can thus be maintained in this screwed state in a stable manner. In this way, it is possible to facilitate fastening of the magnet mounting structure to the spoke without tool. A rubber sheet, an organic resin sheet or the like may be used as the elastic layer.

In the magnet mounting structure according to the present invention, the internal thread member has a semicylindrical groove for receiving a round spoke.

A semicylindrical portion of the round spoke is fit in the groove and the knob member is used to press the round spoke from the above. The spoke is thus held between the knob member and the internal thread member and fastened accordingly by screwing the screw of the knob member into the internal thread. When the elastic layer as described above is provided, the elastic layer also covers the semicylindrical groove.

In the magnet mounting structure according to the present invention, the internal thread member has a flat portion for receiving a flat spoke.

Some of the recent bicycles employ flat spokes. Such a flat spoke is held between the knob member and the internal thread member to fasten the magnet mounting structure to the spoke. It is desirable that the internal thread member includes both of the semicylindrical groove for a round spoke and the flat portion for a flat spoke in order to be used with either of these spokes. The semicylindrical groove for a round spoke may not be provided.

In the magnet mounting structure according to the present invention, the knob member has a plane bottom surface with the screw projecting therefrom.

The bottom surface of the knob member presses the spoke against the internal thread member. If the bottom surface is uneven, the spoke cannot surely be pressed against the semicylindrical groove for example of the internal thread member. The flat bottom surface thus enable the spoke to surely be held between the knob member and the internal thread member to fasten the magnet mounting structure to the spoke.

In the magnet mounting structure according to the present invention, the head portion of the knob member has a grooved periphery.

The grooves on the periphery allow the knob member to firmly be held between fingers without slipping of the fingers off from the head portion to screw the screw of the knob member into the internal thread. The grooved surface increases the frictional force between the fingers and the surface of the knob member. Consequently, the torque added by the fingers in screwing increases and thus the force of holding the spoke also increases. When the elastic layer is provided, the repulsive force from the elastic layer increases and thus the force of holding the spoke also increases. When the elastic layer is provided, the repulsive force from the elastic layer increases. If no elastic layer is provided, elastic forces between respective components increase within the elastic limits and the frictional force also increases. Therefore, the force of attaching the magnet mounting structure to the spoke increases. Then, a weaker force of fingers may be used to achieve a usual force for attachment. For example, it is possible for children and women who are relatively weak in physical strength to easily attach the magnet mounting structure to the spoke.

In the magnet mounting structure according to the present invention, the internal thread member has projections on opposite sides thereof for preventing the spoke from departing therefrom.

The projections are arranged so that the knob member is sandwiched therebetween, and, as a matter of course, the distance between the projections and the knob member is made smaller than the minimum diameter of the spoke. Then, the projections do not hinder the screwing and effectively prevent the spoke from leaving the magnet mounting structure. The internal thread member with the projections on both sides has its longitudinal direction along the direction of connecting the projections.

In the magnet mounting structure according to the present invention, the internal thread member has its width smaller than the diameter of the knob member.

Since the periphery of the head portion of the knob member is locate outside the width of the internal thread member, the screwing operation by fingers can further be facilitated. When the projections are provided on both sides of the internal thread member, the width of the internal thread member refers to the dimension of the internal thread member in the direction perpendicular to the direction of connecting the projections.

In the magnet mounting structure according to the present invention, the internal thread member is formed of organic resin.

The magnet mounting structure is usually made of metal. Therefore such a structure employing the organic resin can be reduced in weight. The demands for weight saving of recent bicycles increase and accordingly wheels and spokes of the bicycles are reduced in weight. Even if a slight weight is added, the weight balance is lost and the rider of the bicycle could feel uncomfortable. Increase in weight can thus be avoided as much as possible so as to minimize the possibility of losing the weight balance and provide comfortableness in riding.

The foregoing and other objects, features, aspect and advantages of the present invention will become more apparent from the following detailed description of the present invention when taken in conjunction with the accompanying drawings.

DESCRIPTION OF THE PREFERRED EMBODIMENTS

Figure 1:
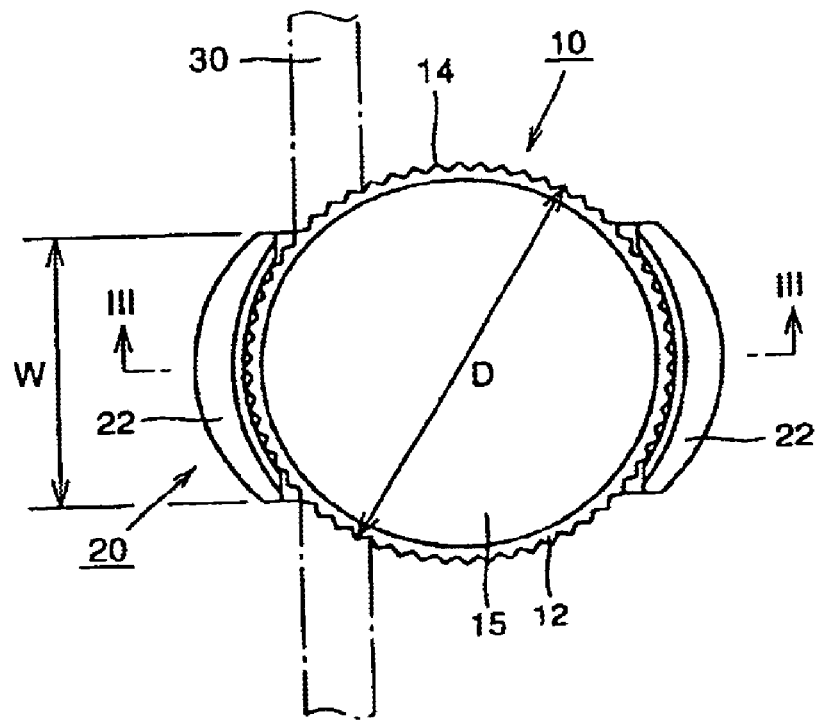
FIG. 1 is a plan view of a magnet mounting structure according to one embodiment of the present invention.

An embodiment of the present invention is now described in conjunction with the drawings. FIG. 1 is a plan view of a magnet mounting structure according to the embodiment of the invention. Grooves 14 are cut on the lateral periphery of a head portion 12 of a knob member 10 in order to facilitate screwing of knob member 10 by fingers. An internal thread member 20 has two projections 22 so that knob member 10 is sandwiched therebetween in order to prevent internal thread members 20 from departing from a spoke 30. The longitudinal direction of internal thread member 20 is along the direction connecting two projections 22. The width of internal thread member 20 is in the direction perpendicular to this longitudinal direction. The width W is a smaller than the diameter D of head portion 12 of knob member 10. The periphery of head portion 12 of knob member 10 is thus locate outside internal thread member 20 so that knob member 10 can easily be turned by finger surfaces.

Figure 2:
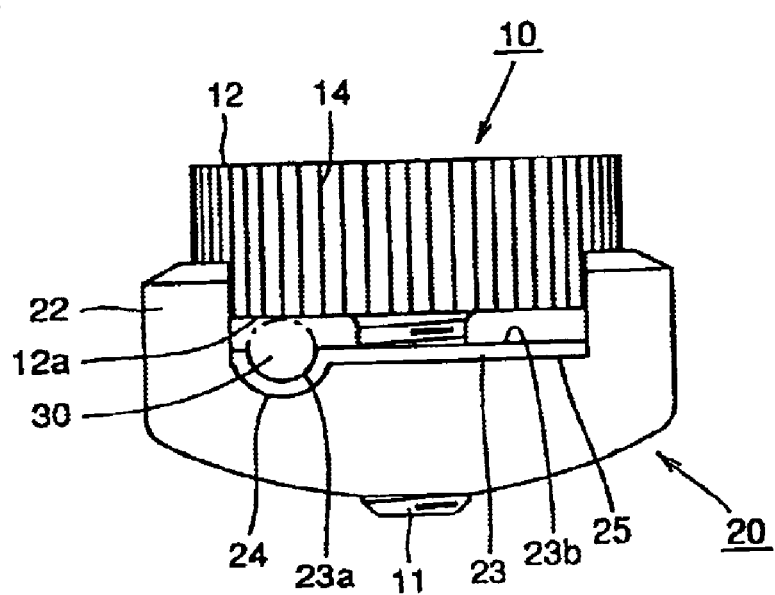
FIG. 2 is a front view of the magnet mounting structure shown in FIG. 1.

FIG. 2 is a front view of the magnet mounting structure shown in FIG. 1. Knob member 10 has a screw portion 11 screwed into internal thread member 20. A rubber sheet 23 serves as an elastic layer is providing on a surface of internal thread member 20 that is opposite to knob member 10. Spoke 30 is held between a groove 23a of rubber sheet 23 and a plane surface 12a of knob member 10. Internal thread portion 20 has a surface under rubber sheet 23 that includes a groove 24 for holding a round spoke and a flat portion 25 for holding a flat spoke. When this magnet mounting structure is used with a flat spoke (not shown in FIG. 2), the flat spoke is held between a flat portion 23b of rubber sheet 23 and plane surface 12a of knob member 10.

Knob member 10 is screwed into internal thread member 20 with spoke 30 held therebetween by touching, with finger surfaces, grooves 14 on the lateral periphery of head portion 12 of knob member 10 and screwing knob member 10 accordingly. At this time, a considerable frictional force is generated between the finger surfaces and grooves 14 so that screwing of knob member 10 is facilitated. A knob member 10 is screwed in, spoke 30 is pressed against rubber sheet 23 on internal thread member 20 and then a repulsive force of rubber sheet 23 is exerted on spoke 30 and as a result the internal thread member itself. This repulsive force causes a frictional force between respective surfaces of screw portion 11 of knob member 10 and a threaded portion (not shown in FIG. 2) of internal thread member 20 to prevent the tightened knob member from loosening. A predetermined repulsive force is required to increase the frictional force between the screw and threaded portion. Then, the force of holding and pressing spoke 30 must have at least a predetermined value in order to cause the predetermined repulsive force. It is thus desired to increase the torque of rotation when knob member 10 is caught between fingers and turned accordingly. This torque is effectively increased by setting the diameter D of head portion 12 of knob member 10 at a predetermined value or more so as to increase the friction between the grooved portion on the lateral periphery and finger surfaces. The friction between the grooved portion and finger surfaces may preferably be increased by cutting grooves at short intervals and shaping apical lines of grooves into sharp edges.

Figure 3:
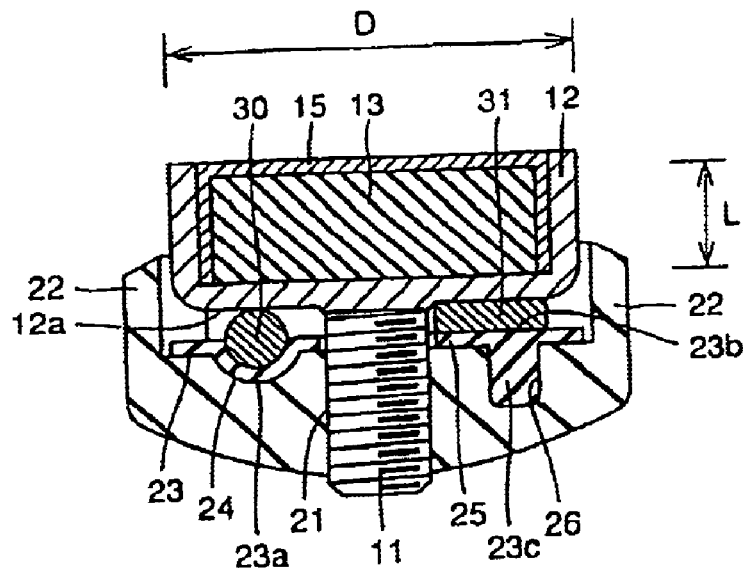
FIG. 3 is a cross sectional view along III—III in FIG. 1.

FIG. 3 shows a cross section along III—III in FIG. 1. A magnet 13 is housed in head portion 12 of knob member 10 and covered with a cover plate 15. Cover plate 15 is fit inside the wall of head portion 12 of knob member 10 and secured therein. Magnet 13 is formed of any magnetic material such as ferrite magnet and rare-earth magnet and has at least a predetermined axial length L. Then, demagnetizing field is insignificant and accordingly a desired magnetic flux density can be generated in the axial direction. Cover plate 15 with which magnet 13 is covered continuously covers the side of magnet 13. If the side is covered with any material having a high magnetic permeability, the axial magnetic flux passes even through the side, resulting in decrease in the axial magnetic flux as described above. Then, the material covering the top and side of magnet 13 as a whole as shown in FIG. 3 is desirably formed of a non-magnetic material. However, if any magnet which is thin and apt to break is used, high-permeability material may be used to cover only the top of the magnet in order to effectively reinforce the magnet and allow the magnet to become closer to a transmitter unit by the thickness of the high-permeability material. The high-permeability material can be bonded to a magnet to cover only the top thereof. When the magnet is to be housed in head portion 12, the corners of the magnetic may be cut off and the side of thereof may be covered with a nonmagnetic material so that no corner is exposed. Then, the risk that the corners of the magnet could be chipped off can be lessened.

Internal thread member 20 has its surface on which rubber sheet 23 is placed and that surface has a rubber sheet engagement hole 26. Rubber sheet 23 has a projection 23c fit in rubber sheet engagement hole 26 so that alignment is facilitated.

Figure 4:
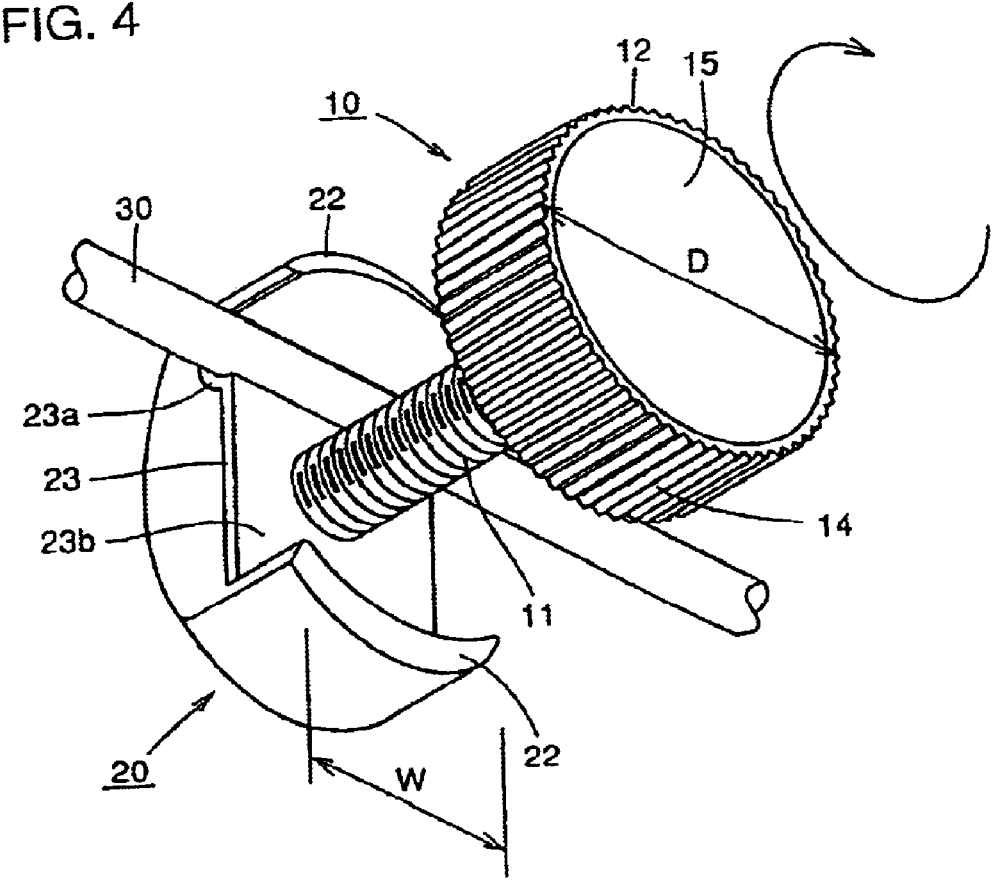
FIG. 4 is a perspective view of the magnet mounting structure in a state being attached to a spoke according to the embodiment of the present invention.
Figure 5:
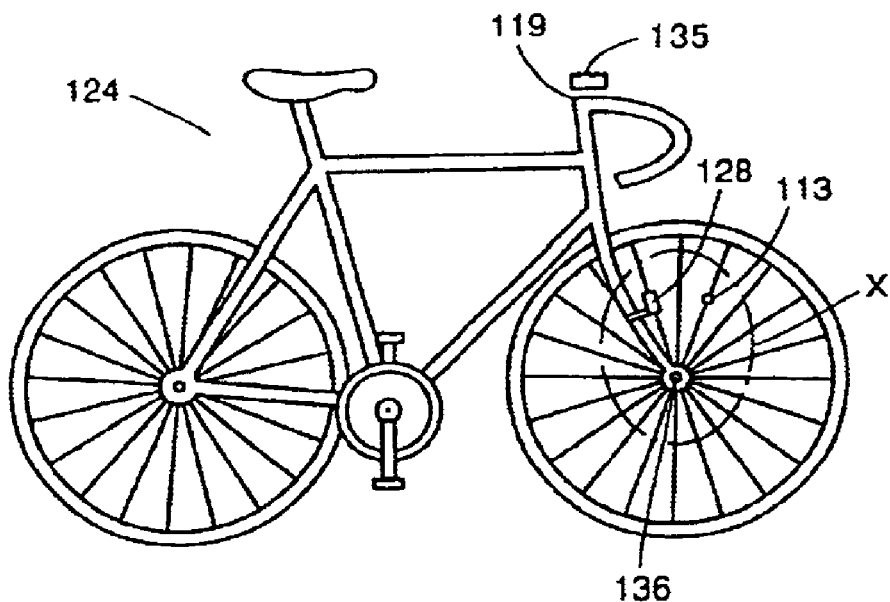
FIG. 5 shows a general bicycle having a speedometer attached thereto.
Figure 6:
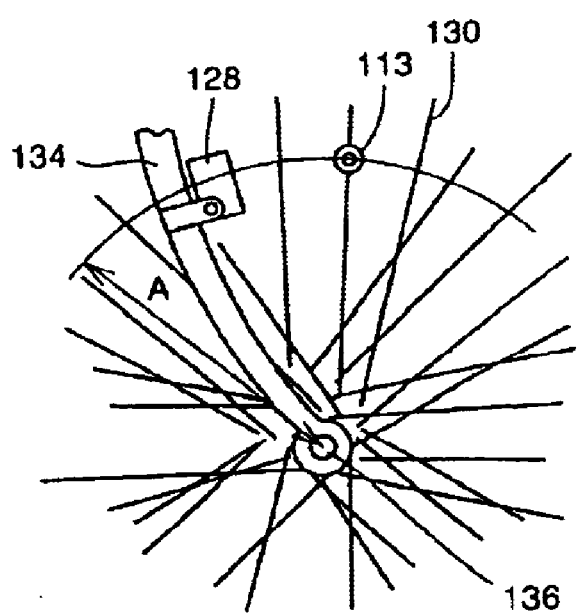
FIG. 6 is an enlarged view of the portion indicated by X in FIG. 5.

Although FIG. 3 shows a round spoke 30 as well as a flat spoke 31 held between knob member 10 and internal thread member 20, it is apparent that only one of the spokes is held therebetween when the magnet mounting structure is actually applied to a two-wheeled vehicle. The magnet mounting structure is used to turn head portion 12 of knob member 10 by holding the grooved periphery between fingers and then screw the screw 11 into an internal threaded portion 21. As the screw 11 is screwed in, round spoke 30 or flat spoke 31 held between rubber sheet 23 and plane surface 12a of head portion 12 of knob member 10 is tightened. Then, the repulsive force described above is exerted on the spoke and finally on the internal thread member itself, resulting in a firmer holding. FIG. 4 is a perspective view showing the state in which the screwing is being effected.

Figure 7:
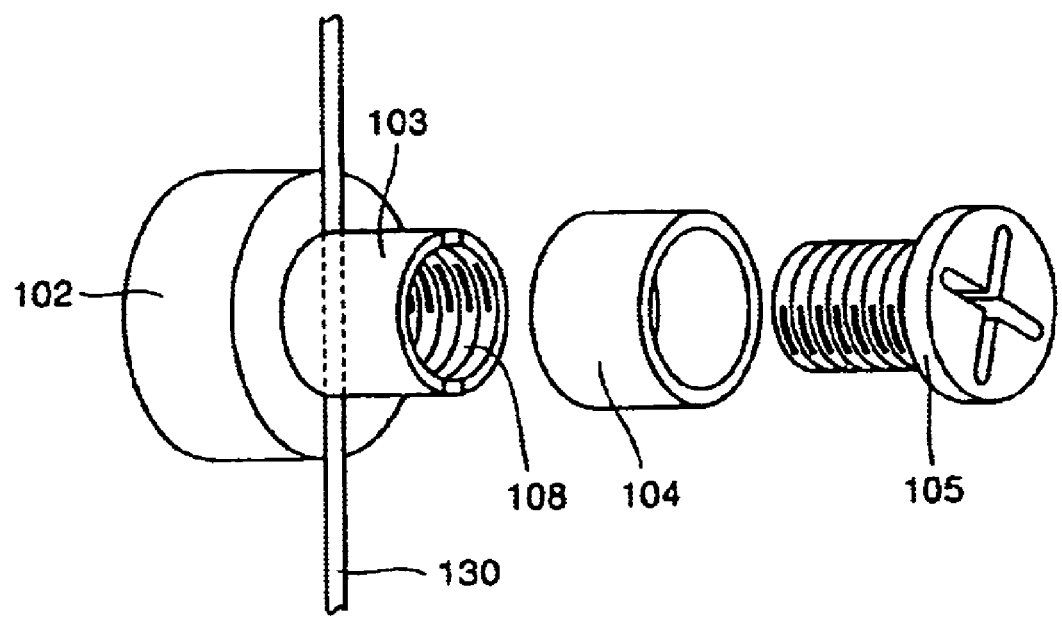
FIG. 7 is an exploded perspective view of a conventional magnet mounting structure.

Internal thread member 20 discussed above is formed of organic resin and magnet 13 is housed within head portion 12 of knob member 10. Thus, reduction in size as well as a remarkable reduction in weight can be achieved. For example, with respect to the conventional magnet mounting structure shown in FIG. 7, the total mass of the ring, setscrew and housing with the magnet contained therein, is 0.008 kg. On the other hand, regarding the magnet mounting structure shown in FIG. 1, the total mass of knob member 10 and internal thread member 20 is 0.004 kg which is a half of the conventional one.

The magnet mounting structure according to the embodiment can be used to hold the spoke between the knob member and the internal thread member by turning the head portion of the knob member 10 with fingers without using any tool such as driver. It is thus possible to easily and surely attach the magnet mounting structure to the spoke. The magnet mounting structure is small in size and lightweight and can generate a sufficiently high magnetic flux density in the axial direction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnet mounting structure for fastening a magnet sensed by a sensor to a spoke of a wheel, comprising:
   a knob member having a screw and a head portion, the head portion containing the magnet; and
   an internal thread member for receiving the screw of the knob member by turning said knob member into said internal thread member,
   an elastic layer disposed on a surface of said internal thread member opposite to said knob member,
   said head portion of said knob member having a grooved lateral periphery for easy torque generation by the fingers of a users the width of the internal thread member being smaller than the diameter of said knob member,
   said spoke being held with a certain length along the longitudinal direction between said knob member and said elastic layer on said internal thread member to fasten said magnet to said spoke, and said knob member not having any notches for insertion of a tool.

2. The magnet mounting structure according to claim 1, wherein said internal thread member has a semicylindrical groove for receiving a round spoke.

3. The magnet mounting structure according to claim 1, wherein said internal thread member has a flat portion for receiving a flat spoke.

4. The magnet mounting structure according to claim 1, wherein said knob member has a flat bottom surface with said screw projecting therefrom.

5. The magnet structure according to claim 1, wherein said internal thread member is formed of an organic resin.

6. A magnet mounting structure according to claim 1, wherein said internal thread member has opposed projections, which project toward said head portion of said knob member so as to sandwich said knob member on opposite sides thereof for preventing the spoke from departing therefrom.

7. A magnet mounting structure for fastening a magnet sensed by a sensor to a spoke of a wheel, comprising:
   a knob member having a screw and a head portion containing the magnet, said head portion having a grooved lateral periphery for facilitating rotation of the knob member;
   an internal thread member for receiving the screw therein by turning said knob member into said internal thread member, said internal thread member having a surface opposite to said knob member provided with an elastic layer,
   said spoke being held with a certain length along the longitudinal direction between said knob member and said elastic layer on said internal thread member to fasten said magnet to said spoke, and
   said knob member not having any notches for insertion of a tool,
   whereby the knob member and the internal thread member are fastened for securing said spoke there between so as to secure said magnet in a desired position on said spoke.

8. The magnet mounting structure of claim 7, wherein the internal thread member has a surface opposite to said knob with at least a portion having a shape complementary to the shape of the outer surface of the spoke for firmly engaging with said spoke.

9. The magnet mounting structure of claim 8, wherein the internal thread member includes opposed projections, which project toward said head portion of said knob member so as to sandwich said knob member on opposite sides thereof, for receiving the head portion of the knob member, the periphery of the head portion being accessible from outside the projections so that the knob member can be easily turned relative to the internal thread member by the fingers of a user.

10. The mounting structure of claim 9, wherein the projection comprise at least a pair of projections each having a width smaller than the diameter of said knob member.

11. A magnet mounting structure for fastening a magnet sensed by a sensor to a spoke of a wheel comprising:
   a knob member having a screw and a head portion containing the magnet, said head portion having a grooved lateral periphery for facilitating rotation of the knob member;
   an internal thread member for receiving the screw therein by turning said knob member into said internal thread member, said internal thread member having a surface opposite to said knob member provided with an elastic layer,
   the internal member including opposed projection means that project toward said head portion of said knob member for sandwiching said knob member on opposite sides thereof,
   said spoke being held with a certain length along the longitudinal direction between said knob member, and said elastic layer on said internal thread members;
   whereby the knob member and the internal thread member are fastened for securing said spoke there between so as to secure said magnet in a desired position on said spoke.

* * * * *